(12) United States Patent
Cron (10) Patent No.: US 8,646,497 B2
(45) Date of Patent: Feb. 11, 2014

(54) PASSIVE TUNED VIBRATION ABSORBER

(75) Inventor: Steven M Cron, Simpsonville, SC (US)

(73) Assignees: Compagnie Generale des Etablissements Michelin (FR); Michelin Recherche et Technique S.A. (CH)

(*) Notice: Subject to any disclaimer, the term of this patent is extended or adjusted under 35 U.S.C. 154(b) by 561 days.

(21) Appl. No.: 13/056,903

(22) PCT Filed: Sep. 16, 2010

(86) PCT No.: PCT/US2010/049110
§ 371 (c)(1),
(2), (4) Date: Jan. 31, 2011

(87) PCT Pub. No.: WO2012/036687
PCT Pub. Date: Mar. 22, 2012

(65) Prior Publication Data
US 2012/0067481 A1    Mar. 22, 2012

(51) Int. Cl.
*B60B 9/26* (2006.01)

(52) U.S. Cl.
USPC ............... 152/80; 152/12; 152/246; 152/270

(58) Field of Classification Search
USPC ......... 152/1, 5, 7, 11, 12, 69, 75, 80–86, 246, 152/323, 324, 326, 270
See application file for complete search history.

(56) References Cited

U.S. PATENT DOCUMENTS

| | | | | |
|---|---|---|---|---|
| 1,035,446 A | * | 8/1912 | Kamppi ..................... | 152/82 |
| 1,063,771 A | * | 6/1913 | Brown ....................... | 152/28 |
| 1,167,706 A | * | 1/1916 | McPherson ................ | 160/145 |
| 1,263,113 A | * | 4/1918 | Rhodus ...................... | 152/75 |
| 1,336,031 A | * | 4/1920 | Gebhardt ................... | 152/85 |
| 1,366,450 A | * | 1/1921 | Harris ........................ | 152/85 |
| 1,436,046 A | * | 11/1922 | Miller ....................... | 152/69 |
| 1,536,417 A | * | 5/1925 | Bolick ....................... | 152/75 |
| 1,639,827 A | * | 8/1927 | Wayne ....................... | 152/6 |
| 3,635,273 A | * | 1/1972 | Patecell .................... | 152/158 |
| 3,642,048 A | * | 2/1972 | Poweleit ................... | 152/323 |
| 3,843,188 A | | 10/1974 | Kirschner | |
| 4,553,577 A | * | 11/1985 | Gregg ....................... | 152/12 |

(Continued)

FOREIGN PATENT DOCUMENTS

| | | |
|---|---|---|
| CN | 1990272 A | 7/2007 |
| FR | 2898077 A1 | 9/2007 |

OTHER PUBLICATIONS

International Search Report and Written Opinion for PCT/US2010/049110 dated Nov. 9, 2010.

(Continued)

*Primary Examiner* — Glenn Dayoan
*Assistant Examiner* — Gregory Blankenship
(74) *Attorney, Agent, or Firm* — Edward Martin Remick (57) ABSTRACT

A passive tuned vibration absorber is used to attenuate unwanted vibrations in the spokes of a non-pneumatic tire and wheel assembly. Each spoke has a cutaway central portion having a tuned vibration absorber n the form of a protruding member having an axial width and a radial height and the radial height of the protruding member is less than a radial height of the spoke. Additionally, a method of determining the vibrational characteristics of the spokes of a non-pneumatic tire and wheel assembly is included.

11 Claims, 7 Drawing Sheets

(56) References Cited

U.S. PATENT DOCUMENTS

| | | |
|---|---|---|
| 4,876,658 A | 10/1989 | Hass |
| 4,921,029 A * | 5/1990 | Palinkas et al. ............... 152/11 |
| 5,223,599 A * | 6/1993 | Gajewski ...................... 528/59 |
| 7,013,939 B2 * | 3/2006 | Rhyne et al. .................. 152/5 |
| 7,201,194 B2 * | 4/2007 | Rhyne et al. .................. 152/5 |
| 7,418,988 B2 * | 9/2008 | Cron et al. .................... 152/5 |
| 7,523,773 B2 * | 4/2009 | Gabrys et al. ................. 152/86 |
| 8,385,040 B1 * | 2/2013 | Chen ............................. 361/221 |
| 2004/0069385 A1 * | 4/2004 | Timoney et al. .............. 152/69 |
| 2009/0173421 A1 | 7/2009 | Love et al. |
| 2011/0240193 A1 * | 10/2011 | Matsuda et al. ............... 152/246 |
| 2012/0067481 A1 * | 3/2012 | Cron ............................. 152/326 |

OTHER PUBLICATIONS

Article entitled "1 Order Tuned Vibration Absorption of a Diesel-Generator" Deicon Dynamics & Controls website: www.deicon.com.

* cited by examiner

PASSIVE TUNED VIBRATION ABSORBER

BACKGROUND

Rotating machinery may be subject to unwanted vibrations due to the operation of the machine. For example, in four stroke engines, including diesel engines driving generators, each cylinder fires every other revolution. This causes the engine vibration to occur at ½ the engine RPM, called the ½ order vibration, and its higher order harmonics namely 1 order, 1½ order, 2 order. In the case of a diesel generator, in addition to the engine causing vibration the ½ order and its harmonics, the generator imbalance causes vibration at 1 order. Order in a machine is equivalent to the rpm of its rotating shaft. For example, 2 order means twice the rotating speed.

It is common practice to use a tuned vibration absorber to attenuate unwanted steady-state vibrations in such machinery. In this common method, a relatively small spring mass system is tuned to have its resonant frequency match the frequency of the unwanted machinery vibration. When attached to the machine, the added spring mass system will resonate 180° out of phase with the main body of the machinery and counteract the unwanted machinery vibration. This added spring mass system is sometimes referred to as an undamped vibration absorber since no damper is required in the system. Note that while the absorber will effectively reduce the unwanted vibrations at a target frequency, it does have the side effect of creating two new resonant frequencies in the combined dynamic system; one below the targeted frequency and one above the targeted frequency.

In a non-pneumatic tire and wheel assembly as described in U.S. Pat. No. 7,201,194, the assembly includes an outer annular band that contacts a road surface and supports the load on the tire. A plurality of web spokes function in tension to transmit the load forces between the annular band and a wheel or hub. Accordingly, a tire of the invention supports its load solely through the structural properties and, contrary to the mechanism in pneumatic tires, without support from internal air pressure. The structurally supported tire of the invention does not have a cavity for containing air under pressure, and accordingly, does not need to form a seal with the wheel rim to retain internal air pressure. The structurally supported tire does not require a wheel as understood in the pneumatic tire art. For the purposes of the following description, the terms "wheel" and "hub" refer to any device or structure for supporting the assembly and mounting to the vehicle axle or other device, and are considered interchangeable herein. Support forces are generated by tension in the web spokes not connected to the ground-contacting portion of the annular band. The wheel or hub can be said to hang from the upper portion of the tire. Preferably, the web spokes have a high effective radial stiffness in tension and a low effective radial stiffness in compression. The low stiffness in compression allows the web spokes attached to the ground-contacting portion of the annular band to bend for absorbing road shocks and to better conform the annular band to the irregularities in the road surface. To facilitate the bending of the web spokes of the ground-contacting portion of the tread, the spokes can be curved.

As an individual web spoke rolls through 360 degrees of rotation, it is subjected to tension forces, and then compression forces in the region of ground contact with the ground that cause a "buckling" of the spoke. Upon exiting the region of ground contact, the flexed spoke is suddenly extended or snapped back into a state of tension. This sudden extension is capable of exciting an unwanted vibration of the spoke. These unwanted vibrations may produce bothersome noise as the non-pneumatic tire and wheel assembly rolls, or may contribute to fatigue in the spokes themselves. The inventor has found that the steady state absorbers known in the art do not possess a damping mechanism that will give the desired result of reducing the unwanted spoke vibrations.

Therefore, it is desirable to have a non-pneumatic tire and wheel assembly that is capable of reducing these unwanted vibrations. The inventor has discovered a solution to this problem by a spoke configuration that includes an integral tuned and damped vibration absorber.

SUMMARY OF THE INVENTION

In the current invention, a passive tuned vibration absorber is used to attenuate the unwanted vibrations in the spokes of a non-pneumatic tire and wheel assembly. A non-pneumatic tire and wheel assembly comprises an outer annular band for contacting a road surface and for supporting the load on the assembly, a hub or wheel hub for attaching the assembly to a rotating device, and a plurality of web spokes extending from the hub to the annular band for transmitting the load forces between the annular band and a wheel or hub. Each spoke has a radially inner portion having a first axial width, a radially outer portion having a second axial width, and a cutaway center portion having third axial width less that either of the first or second axial widths. The cutaway central portion further comprises a protruding member having an axial width and a radial height and the radial height of the protruding member is less than a radial height of the spoke.

The protruding member of the non-pneumatic tire and wheel assembly has an axially inner portion and an axially outer portion and a radial height of the axial outer portion is greater than a radial height of the axially inner portion. In a first example the height of the axially inner portion is one-half the height of the axially outer portion.

In a second example, the protruding member has an axially inner portion and an axially outer portion and an axially outer portion of constant radial height.

In still a third example, the protruding member has an axially inner portion and an axially outer portion and a radial height of the outer portion is less than the radial height of the inner portion. The shape of the protruding member is bounded on the inner portion by a radial height, on the outer portion by an arcuate section, and the inner and outer portions are joined to form a tapered central section. In some variants the arcuate section comprises a constant radius from about ten percent to thirty percent, and more specifically about twenty percent, of the radial height of the spoke. These variants may further comprise a protruding member having an axial width from about twenty percent to thirty percent and more specifically about twenty-five percent, of the radial height of the spoke. The radial height of the inner portion may be about forty percent to about sixty percent, and more specifically about fifty percent, of the radial height of the spoke.

The current invention additionally includes a method of determining the vibrational characteristics of the spokes of a non-pneumatic tire and wheel assembly comprising the steps of:

Defining a reference spoke geometry,
Deflecting the reference spoke slowly into a flexed shape by a uniform radial displacement of the radially upper boundary of the spoke,
Snapping the reference spoke into a state of tension by application of a uniform radial displacement,
Maintaining the boundary of the reference spoke at the applied radial displacement, Recording the reaction force at one spoke end of the reference spoke and of the test spoke, Defining a test spoke geometry, Deflecting the test spoke slowly into a flexed shape by a uniform radial displacement of the radially upper boundary of the spokes, Snapping the test spoke into a state of tension by application of a uniform radial displacement, Maintaining the boundary of the test spoke at the applied radial displacement, Recording the reaction force at one spoke end of the test spoke, and Comparing the reaction force for at the spoke end for the reference spoke and the test spoke.

In the method of determining the vibrational characteristics of the spokes of a non-pneumatic tire and wheel assembly, the snapping step is performed in 0.01 seconds, which equates to the typical time for a spoke of a passenger car size non-pneumatic tire and wheel assembly rolling at 80 to 100 kph to leave the ground contact and return to a state of tension outside the ground contact region. The steps of the method may be performed using a non-linear simulation or may be performed experimentally.

DETAILED DESCRIPTION OF THE INVENTION

Figure 1:
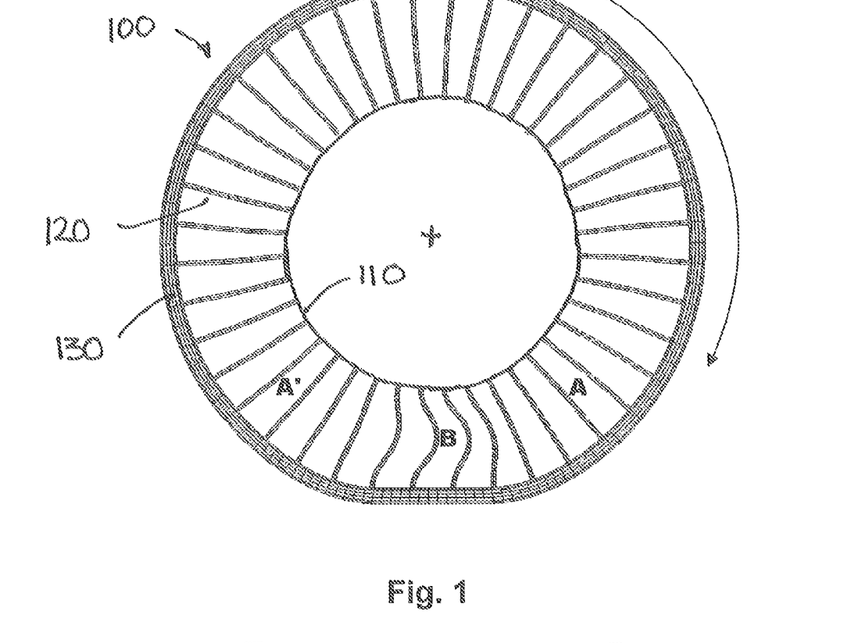
FIG. 1 illustrates an exemplary non-pneumatic tire and wheel assembly 100 and schematically depicts the deformation of the spokes during rolling contact with the ground.

FIG. 1 depicts a non-pneumatic tire and wheel assembly 100 comprising an outer annular band 130 that contacts a road surface and supports the load on the assembly. A plurality of web spokes 120 that extend in a generally radial direction. At a radially inner end, the spoke 120 attaches to the hub 110, and at a radially outer end, the spoke 120 attaches to annular band 130. The spokes 120 function in tension to transmit the load forces between the annular band 130 and a wheel or hub 110. In the exemplary structure of the assembly shown in FIG. 1, a hub 110 provides a means by which to attach the assembly to a vehicle axle or other rotating part. It is the understood that the web spokes 120 are the force transmitting members connecting the outer annular band 130 to the hub 110. The annular band 130 may further comprise reinforcing elements to obtain the desired circumferential and bending stiffness requirements. The annular band 130 may optionally include an addition annular layer to serve as a ground contacting tread.

Referring still to FIG. 1, when the non-pneumatic tire and wheel assembly rotates on its hub, the outer annular band is deformed and deflected in the ground contact region and retains an essentially circular shape outside the ground contact region. A spoke at position A is in tension as it approaches the ground contact region. As that spoke enters the ground contact region, the tension is reduced and the spoke takes on a flexed shape. The spoke is fully flexed at position B at the center of the contact region. As the spoke exits the ground contact region, the spoke again enters a state of tension. At position A' the spoke has returned to its initial state of tension. The abrupt transition from the flexed shape at B to tension at A imparts an initial velocity to the spoke and causes the spoke to vibrate. In the circumferential section of the assembly between point A' and point A, the section outside of the contact region, the spokes vibrate freely with no further excitation. If the spoke material possesses viscous or hysteretic dynamic properties, then these free vibrations may be dissipated.

Upon consideration of the above description of non-pneumatic tire and wheel assembly spoke vibrations, one realizes that the spoke vibrations are transient in nature, and thus, the undamped tuned vibration absorber known in the art is not directly applicable. However, if one understands the response of the spoke, as an undamped multi-degree-of-freedom system, to its initial excitation; one may find an alternate method for attenuating spoke vibrations.

The response of an undamped multi-degree-of-freedom system to such an initial velocity is given in Equation (1) as, $$\{x(t)\} = \sum_{r=1}^{N} \left( \{u^r\}^T [m] \{\dot{x}_0\} \frac{1}{\omega_r} \sin\omega_r t \right) \{u^r\} \quad (1)$$

where,

{x(t)} is the vector of the displacement response of the system as a function of time, t $\{u^r\}$ is the vector of the $r^{th}$ mass normalized mode shape of the system,

[m] is the system mass matrix describing the mass at each point in the structure, $\{\dot{x}_0\}$ is the initial velocity vector, $\omega_r$ is the characteristic frequency or eigenvalue of the $r^{th}$ mode.

Now assume that the initial excitation of the spoke can be described as an initial velocity that is proportional to the first vibrational mode shape of the spoke, $$\{\dot{x}_0\} = A\{u^1\} \quad (2)$$

where,

A is the proportionality constant between $\{\dot{x}_0\}$ and $\{u^1\}$ $\{u^1\}$ is the shape of the first mode of the spoke.

Upon substitution of Equation (2) into Equation (1), Equation (1) can be rewritten as, $$\{x(t)\} = \sum_{r=1}^{N} \left( A\{u^r\}^T [m]\{u^1\} \frac{1}{\omega_r} \sin\omega_r t \right) \{u^r\}. \quad (3)$$

One can observe that $\{u^r\}^T[m]\{u^1\}=0$ for $r \neq 1$ and $\{u^r\}^T[m]\{u^1\}=1$ for $r=1$ so that Equation 3 simplifies to, $$\{x(t)\} = \frac{A}{\omega_1} \sin\omega_1 t \{u^1\}. \quad (4)$$

This expression reveals that if the initial excitation velocity of the spoke is proportional to the first mode of vibration of the spoke, then the dynamic response of the spoke will be entirely in the first mode shape. Conversely, if the initial excitation velocity is very different in terms of proportionality to any particular mode shape then the response will be a mixture of modes since $\{u^r\}^T[m]\{\dot{x}_0\} \neq 0$ for all $\{u^r\}$. The question then is whether the initial excitation of a typical spoke looks similar to the first vibrational mode of the spoke.

Figure 2A:
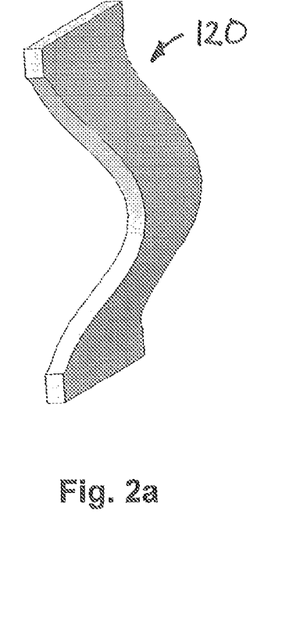
FIG. 2a illustrates a spoke 120 shown in its deformed or flexed shape near the center of the contact region.
Figure 2B:
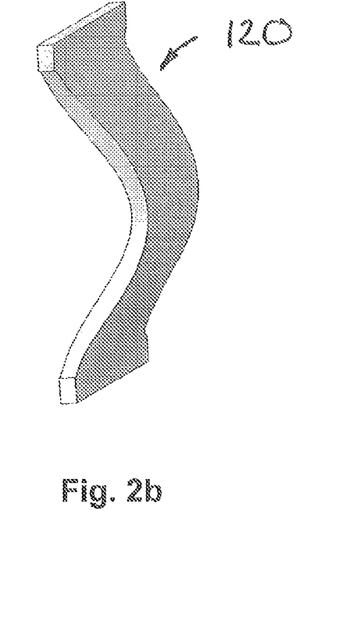
FIG. 2b illustrates the shape of the first mode of vibration of a spoke 120.

Turning now to FIG. 2a, a spoke 120 is shown in its deformed or flexed shape near the center B of the contact region (see FIG. 1). FIG. 2b shows the expected shape of the first mode of vibration of a spoke 120. When the spoke 120 having a deformed shapes as shown in FIG. 2a is snapped back to into tension at A' it will have an initial velocity profile proportional to the expected shape of the first mode of vibration shown in FIG. 2b.

Figure 3:
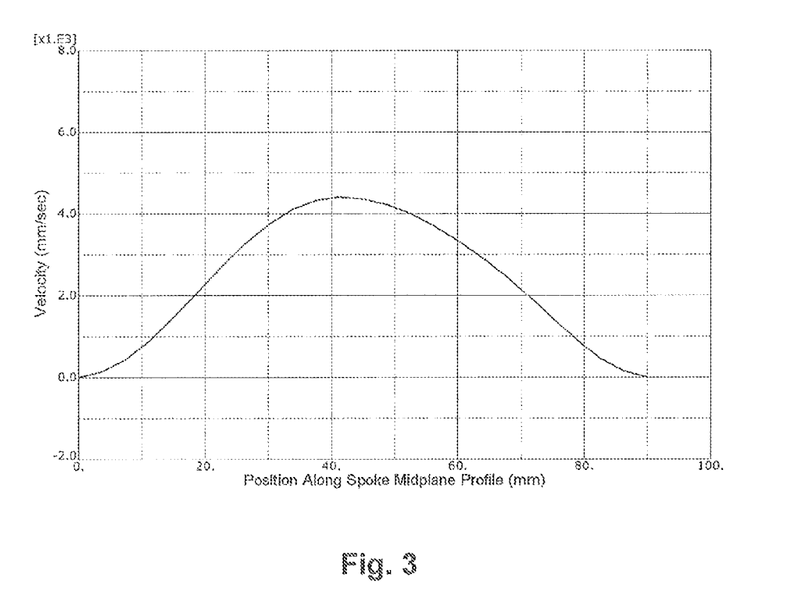
FIG. 3 is a graphical representation of the velocity profile at the midplane of a spoke 120 at the instant where the spoke returns to a state of tension.

FIG. 3 is a graphical representation of the velocity profile at the spoke midplane at the instant where the spoke 120 is returned to a state of tension. The abscissa is a curvilinear coordinate following the spoke 120 from its junction with the hub 110 (position=0 mm) up to the junction of the spoke with the annular band 130 (position=90 mm). The ordinate plots the velocity of a particular point on the spoke. In this case, the velocity is in a coordinate system rotating with the wheel assembly such that the velocity is zero at the two ends of the spoke. Clearly, the shape of the initial velocity profile shown in FIG. 3 is very close to the shape of the first mode of vibration shown in FIG. 2b. Thus, one could expect that the vibrational response of the spoke will be almost entirely in the first mode of vibration.

A novel approach to attenuating the vibrations of the spokes of a non-pneumatic tire and wheel assembly is now apparent: If the shape of the first few vibrational modes of the spoke are not proportional to the flexed shape and associated velocity profile shown above, then the response of the spoke will be dispersed to multiple modes of vibration. If one can excite multiple spoke modes rather than just one, the amplitude of the response in each mode will be lower than the response given by exciting only the first spoke mode. In addition, since the spoke material, such as polyurethanes, rubbers, etc. typically dissipate energy in cyclic excitation; the energy dissipation should be increased if multiple vibrational modes are active in the response rather than having only a single mode active.

Figure 4:
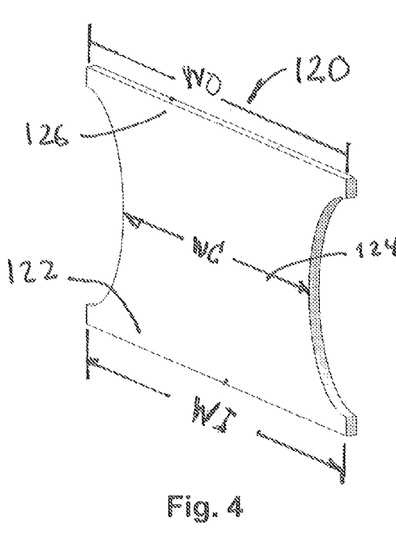
FIG. 4 is a view of a spoke 120 for a non-pneumatic tire and wheel assembly having a cutaway center portion.

Now turning to FIG. 4, which provides a view of a spoke 120 for a non-pneumatic tire and wheel assembly having a cutaway center portion. An example of this cutaway spoke geometry and the method by which to specify this geometry can be found in U.S. Pat. No. 7,418,988. For the purpose of illustrating the physical mechanisms, spoke 120 has a radially inner portion 122 connecting with the hub 110, a radially outer portion 126 connecting with the annular band 130 and a central cutaway portion 124. The cutaway portion 124 has an axial width WC less than a first axial width WI of the inner portion 122 or a second axial width WO of the outer portion 126. For the non-limiting example shown in FIG. 4, both the width WI of the inner portion 122 and the width WO of the outer portion 126 have equal widths in the axial direction of 200 mm. The cutaway section 124 was determined according to the teachings of U.S. Pat. No. 7,418,988 and has an axial width WC of 148.5 mm, thereby producing an axial depth of the cutaway of 25.75 mm. The spoke 120 has a length L defined as the straight-line distance between the point of attachment to the annular band 130 and the point of attachment to the hub 110. The spoke 120 has a thickness of 4 mm. Note that the spoke 120 may have an angular orientation that is not purely radial. The exemplary spoke 120 is made of material having a non-linear stress-strain constitutive property.

The elastic properties are measured experimentally, and then the acquired data is used in the simulation model. In this example, the effective tensile modulus of the material is about 37 MPa and the hysteretic loss, specified as the loss tangent "tangent (delta)" is about 0.07. For this example, the tangent (delta) value was measured in the following manner: A sample of the spoke material has deflected in shear to +/−10% strain at 10 Hz (sinusoidal excitation) at a temperature of 25 degrees Celsius. The force and displacement signals were then compared for one cycle of deformation and the phase difference observed. Delta is the phase difference between the displacement signal and the force signal. The specific experimental methods and material modeling are not a limitation as long as a consistent methodology is used throughout that would be apparent to one skilled in the art of non-linear materials.

Figure 5:
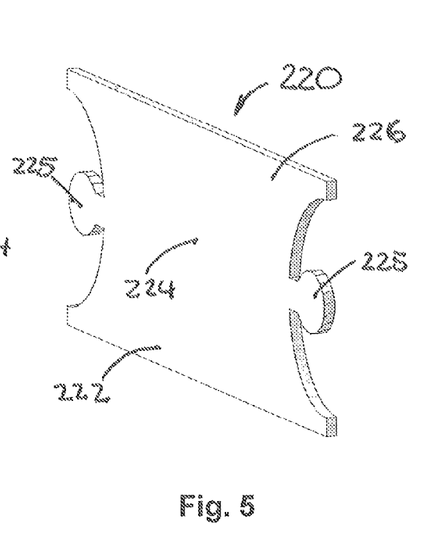
FIG. 5 is a view of a spoke 220 for a non-pneumatic tire and wheel assembly having a cutaway center portion and a first example of a passive spoke vibration damper.

FIG. 5 is a view of a spoke 220 for a non-pneumatic tire and wheel assembly like spoke 120 and with a first example of a passive spoke vibration damper. Spoke 220 has a cutaway center portion 224, an inner portion 222, and an outer portion 226. Two protruding members or flaps 225 have been added to the original design of spoke 120. These act to generate additional low order vibrational modes in response to the spoke rapidly changing from the flexed shape at the contact region B to the state in tension at A'. These vibrational modes have shapes that are significantly different from the flexed shape of the spoke in the contact region B. In the example of spoke 220, the width (measured in the radial direction) of the connection between the flap and the main part of the spoke is half the width of the main part of the flap. The main part of the flap is shown with a circular shape, but other shapes may be substituted.

Figure 6:
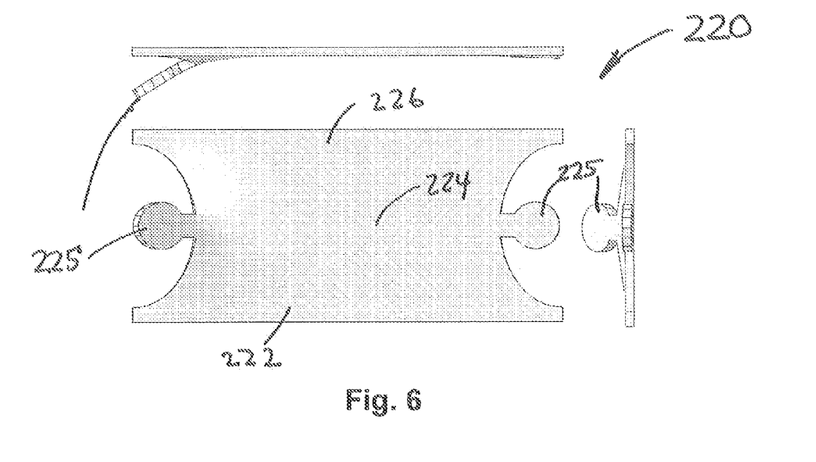
FIG. 6 provides three views of a spoke 220 illustrating the first and second vibrational mode shapes, the first view is a plan view, the second a top view looking radially inward on the spoke, and the third an end view looking axially inward on the spoke first and second mode FIG. 7 provides three views of a spoke 220 illustrating the third vibrational mode shape, the first view is a plan view, the second a top view looking radially inward on the spoke, and the third an end view looking axially inward on the spoke.
Figure 7:
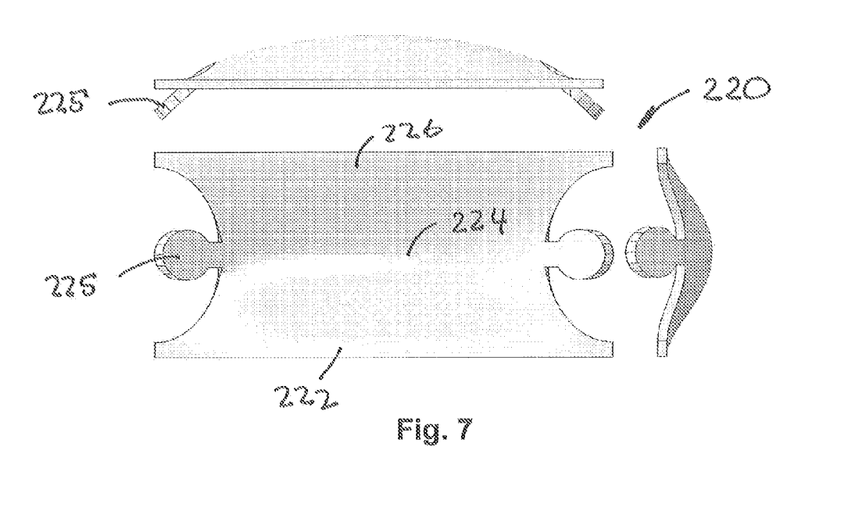

FIG. 6 shows the first two mode shapes of the new spoke 220, including a view essentially normal to the spoke, a top view looking radially inward on the spoke, and an end view looking axially inward on the spoke. In these first two modes, the flaps 225 are alternately excited; i.e. right side then left side and repeating. The characteristic frequency of the first two modes was determined to be 114 Hz. FIG. 7 shows the third vibrational mode shape of the spoke 220 with the same three views of the spoke. The third mode exhibits a double concave shape wherein the flaps oscillate in unison and the central portion 224 of the spoke oscillates in opposition to the appendages and with significant bending of the spoke about two axes. The characteristic frequency of the third mode was determined to be 197 Hz.

Clearly, the shapes of all three modes of the spoke 220 different significantly from the flexed shape of spoke 120 at the center of contact, as was shown in FIG. 2a. When snapped into tension one would expect spoke 220 to respond in multiple modes and to have the ensuing vibrations decay more quickly than the spoke without appendages.

To evaluate the effectiveness of the new design an explicit dynamic finite element (FE) simulation was carried out using Abaqus/EXPLICT software from Dassault Systèmes. This simulation proceeds in the following manner:

1. Deflect the spoke slowly into its flexed shape by a uniform radial displacement of the boundary of the upper portion 226.
2. Snap the spoke into a state of tension by a uniform radial displacement applied in a time period of 0.01 seconds.
3. Maintain the spoke boundaries fixed at the final displacement and record the reaction force at one spoke end.
4. Compare the reaction force for designs with and without dampers.

The time interval of 0.01 seconds for the snapping step equates to the typical time for a spoke of a passenger car size non-pneumatic tire and wheel assembly rolling at 80 to 100 kph to leave the ground contact region B and return to a state of tension in the region A' outside the ground contact region. One skilled in the art could vary the snapping time according to the size of the assembly and its rolling speed.

Figure 8:
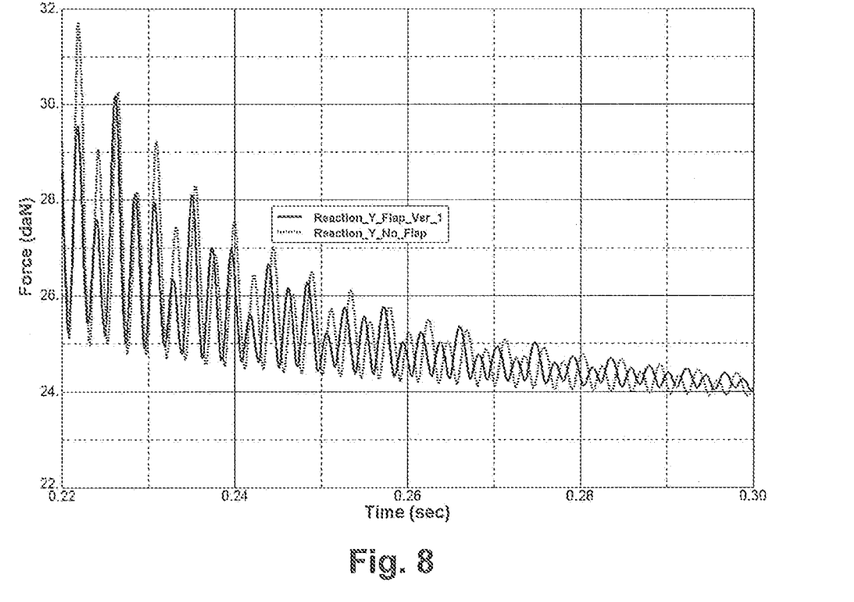
FIG. 8 is a graphical representation comparing the reaction force (daN) vs. time (seconds) at one spoke end for a spoke 220 and a reference spoke 120.

FIG. 8 compares the raw force signal after the snap for the reference spoke 120 and for the spoke 220 with the flaps 225. The graph shows a time interval starting 0.22 seconds after the process of slowly flexing and snapping and continuing until 0.08 seconds after the snap. This time interval was chosen since it roughly corresponds to the amount of time required for the non-pneumatic tire and wheel assembly to rotate one revolution at a forward speed of 90 kph.

The reaction force response of the spoke 220 with the flaps 225 is less than or equal to the response of the reference spoke 120 at all times. The benefit of the flap may be more clearly appreciated by applying a Fast Fourier Transform (FFT) to the raw time domain data so that the response is described in the frequency domain rather than the time domain.

Figure 9:
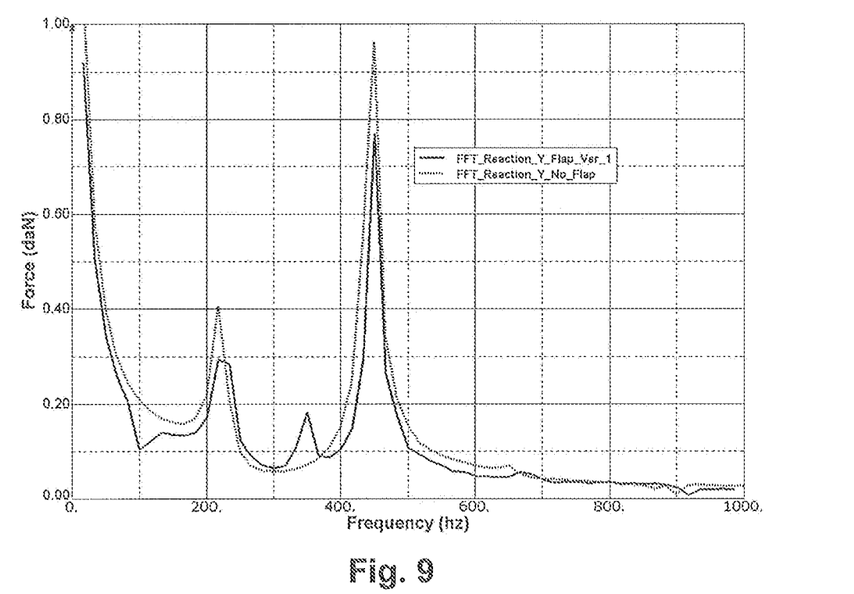
FIG. 9 is a graphical representation comparing a Fast Fourier Transform of the reaction force (daN) vs. frequency (Hz) at one spoke end for a spoke 220 and a reference spoke 120.

FIG. 9 displays the same data as FIG. 8, but now converted to the frequency domain. It is clear that the addition of the damper flaps has attenuated the peak responses. The magnitude of the first peak, which occurs at approximately 220 Hz, is reduced by about 28% and the magnitude of the second peak, which occurs approximately at 450 Hz, is attenuated by about 20%.

Yet a third method to evaluate this data is to perform a time integration of the variable part of the force vs. time signal. This calculation provides two indicators: 1) how quickly the vibration decays, and 2) how much momentum is transferred to the non-pneumatic tire and wheel assembly. This final method is particularly convenient since it permits a comparison of a single quantitative indicator for each design. The integrated value for the reference spoke 120 without the flaps is 0.1010 daN-sec, whereas the integrated value for the spoke 220 with the flaps is 0.0846 daN-sec. A reduction of 16% was achieved.

Figure 10:
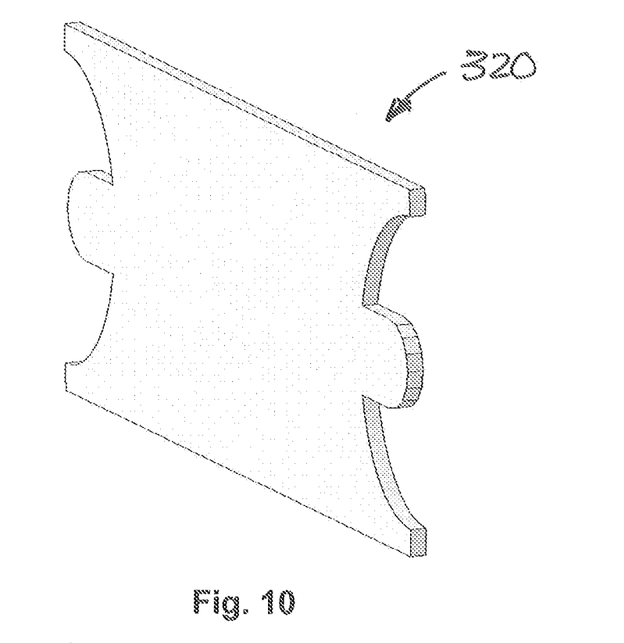
FIG. 10 is a view of a spoke 320 for a non-pneumatic tire and wheel assembly having a cutaway center portion and a second example of a passive spoke vibration damper.
Figure 11:
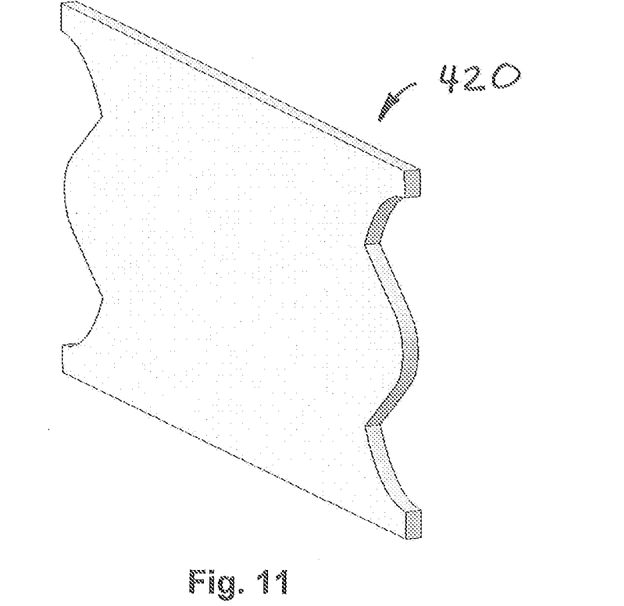
FIG. 11 is a view of a spoke 420 for a non-pneumatic tire and wheel assembly having a cutaway center portion and a third example of a passive spoke vibration damper.

Further Optimizations of the Basic Design:

The design of spoke 220 is configured such that the width of the connection between the flap and the main part of the spoke is half the width of the main part of the flap. Further optimization of the damping property of the flap is obtained with the improved designs shown in FIG. 10 and FIG. 11. FIG. 10 depicts a spoke 320 an elongate shape of the flap where the width of the axially inner portion connecting to the spoke, is equal to the width of the axially outer portion of the flap. FIG. 11 depicts a spoke 420 having a further optimized shape rounded, triangular element protruding from the cutaway portion. As used herein, rounded triangular element means the shape of the flap is bounded on the inner portion by a radial height, on the outer portion by an arcuate section of constant or varying radius, and the inner and outer portions are joined to form a tapered central section. In the exemplary spoke 420, the width of the connection is about two times the width of the flap.

Figure 12:
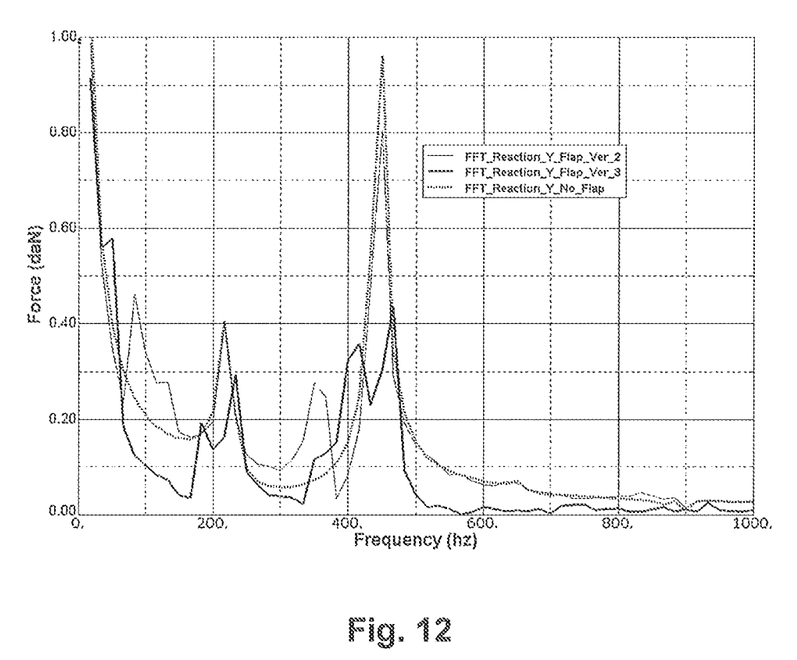
FIG. 12 is a graphical representation comparing a Fast Fourier Transform of the reaction force (daN) vs. frequency (Hz) at one spoke end for a spoke 320, a spoke 420, and a reference spoke 120.

The base geometry of spoke 320 and of spoke 420 is the same as has been previously described for the reference spoke 120. Likewise, the same material properties were used for each model. The dynamic FE modeling was performed using the geometry of the spoke 320 and the spoke 420 as the input geometry to the FE model. FIG. 12 presents the results of these simulations where the data were processed by FFT, and are then presented in the frequency domain. FIG. 12 shows the results of the Fast Fourier Transform comparisons for the two additional spoke damper designs, spokes 320 and 420, compared to the reference spoke 120. The frequency response curve for spoke 320 having the constant width is slightly less effective than the reference spoke 120. However, response curve for the spoke 420 having the rounded triangular element is surprisingly more effective at reducing the transient vibrations caused by snapping the spoke. The first peak near 220 Hz is reduced by 28% and the second peak near 450 Hz is reduced by 54%. The time integration technique previously discussed indicates at 22% reduction for the spoke 420 when compared to the reference spoke 220.

TABLE 1

Damping Effectiveness (a plus sign indicates lack of attenuation)

| Spoke Design | Attenuation of 220 Hz Peak (%) | Attenuation of 450 Hz Peak (%) | Time Integration (%) |
| --- | --- | --- | --- |
| Reference (120) | ref | ref | ref |
| Flap (220) | 28 | 20 | 16 |
| Constant Width (320) | 1 | 16 | 9 |
| Rounded Triangular (420) | 28 | 54 | 22 |
| Straight-sided Spoke | ~0 | +60 | +20 |

Figure 13:
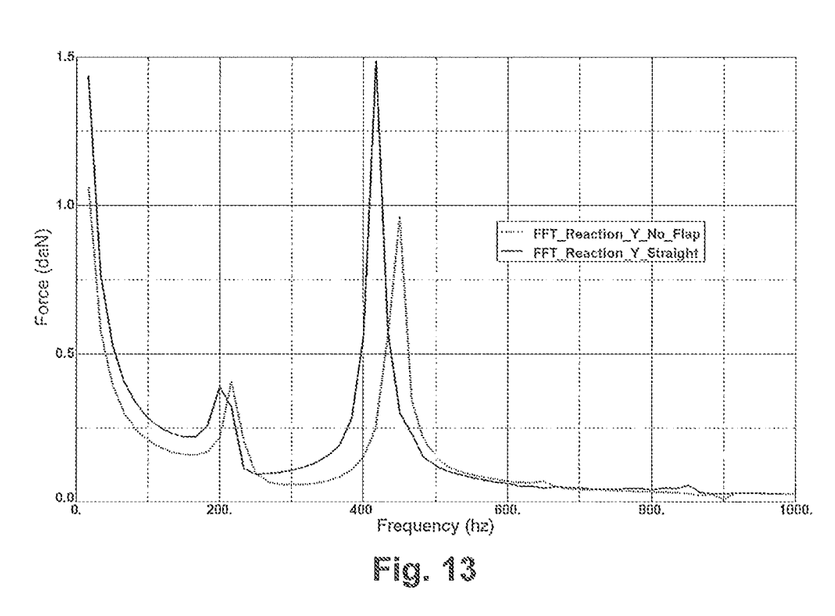
FIG. 13 is a graphical representation comparing a Fast Fourier Transform of the reaction force (daN) vs. frequency (Hz) at one spoke end for a spoke having straight sides without a cutaway and a reference spoke 120.

Absent the knowledge disclosed herein, one skilled in the art would reasonably assume that a passive damper configuration with added mass would produce a commensurate reduction in spoke vibration. Simply stated, the added mass of a hysteretic material should be expected to dissipate more vibrational energy. The data shown in Table 1 above demonstrates that the vibration attenuation is not simply a function of the added mass. To illustrate further this discovery, one final comparison will be presented. For this comparison, a spoke geometry with straight sides, that is to say a spoke of constant axial width without a cutaway was analyzed and compared to the reference spoke 120 with the cutaway. All other parameters were held constant. FIG. 13 presents the frequency domain response of the two spokes. The vibration peaks near 200 Hz are substantially equal. However, the vibration peak near 450 Hz is 60% higher for the straight-sided spoke. It is clear that simply adding mass by filling in the remainder of the scalloped area has degraded the attenuating properties of the spoke. Therefore, amount and distribution of the added mass must be carefully determined.

Figure 14:
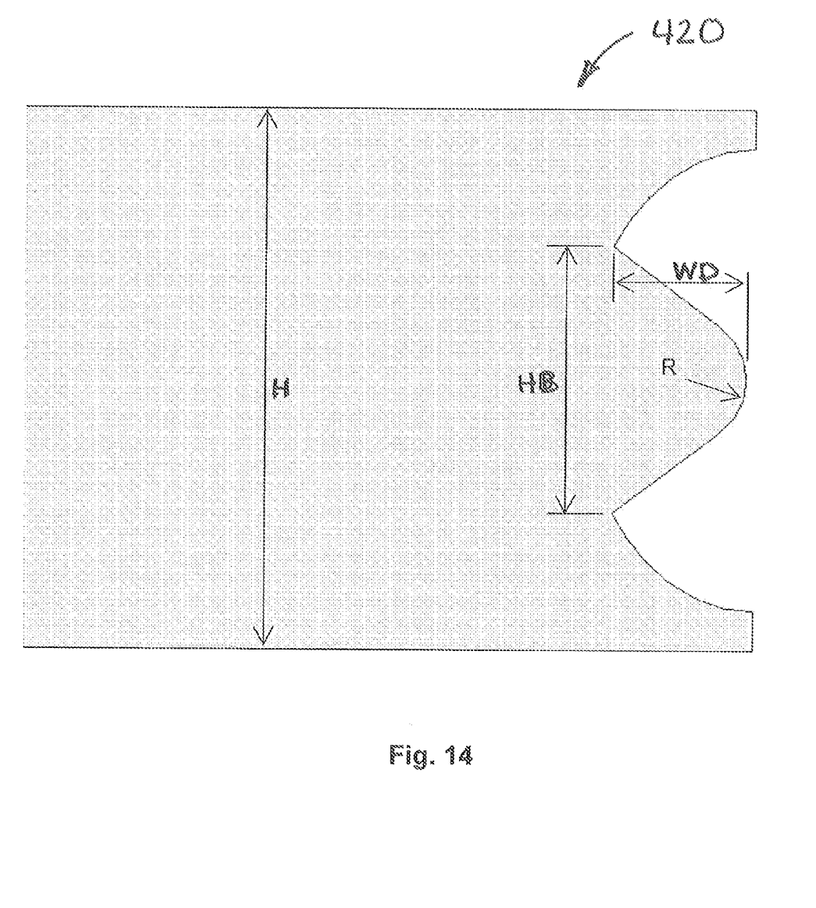
FIG. 14 is a view of the right hand half of a spoke 420 for a non-pneumatic tire and wheel assembly showing a detail of the third example of a spoke damper.

The parameters for a preferred design for the spoke damper having a rounded triangular shape such as spoke 420 have been determined. FIG. 14 is a more detailed description of a spoke having the design attributes of spoke 420. The geometry for the damper is parametric with respect to the overall height H of the spoke as a starting point for a preferred design, the spoke 420 has a rounded triangular damper having a base height HB of about 50% of the height H of the spoke, a damper width WD of about 25% of the height H of the spoke, and a damper tip radius R of 20% of the height H of the spoke. Note that while the above parameters indicate a very specific design, in fact, it is most likely that an optimum design would be found by varying these parameters by +/−20% in a finite element simulation such that the reaction force responses shown above are minimized.

While this invention has been described with reference to particular embodiments and examples thereof, it shall be understood that such description is by way of illustration and not by way of limitation. Accordingly, the scope and content of the invention are to be defined only by the terms of the appended claims.

The invention claimed is:

1. A non-pneumatic tire and wheel assembly comprising an outer annular band for contacting a road surface and for supporting the load on the assembly, a hub or wheel hub for attaching the assembly to a rotating device, and a plurality of web spokes extending from the hub to the annular band for transmitting the load forces between the annular band and a wheel or hub, and each spoke having a radially inner portion having a first axial width, a radially outer portion having a second axial width, and a cutaway center portion having third axial width less that either of the first or second axial widths, wherein the cutaway central portion further comprises a protruding member having an axial width and a radial height, and the radial height of the protruding member is less than a radial height of the spoke.

2. The non-pneumatic tire and wheel assembly according to claim 1, wherein the protruding member has an axially inner portion and an axially outer portion and a radial height of the axial outer portion is greater than a radial height of the axially inner portion.

3. The non-pneumatic tire and wheel assembly according to claim 2, wherein the height of the axially inner portion is one-half the height of the axially outer portion.

4. The non-pneumatic tire and wheel assembly according to claim 1, wherein the protruding member has an axially inner portion and an axially outer portion and an axially outer portion of constant radial height.

5. The non-pneumatic tire and wheel assembly according to claim 1, wherein the protruding member has an axially inner portion and an axially outer portion and a radial height of the outer portion is less than the radial height of the inner portion.

6. The non-pneumatic tire and wheel assembly according to claim 5, wherein the shape of the protruding member is bounded on the inner portion by a radial height, on the outer portion by an arcuate section, and the inner and outer portions are joined to form a tapered central section.

7. The non-pneumatic tire and wheel assembly according to claim 6, wherein the axially outer portion is bounded by an arcuate section of constant radius.

8. The non-pneumatic tire and wheel assembly according to claim 7, wherein the radius of the arcuate section is from about ten percent to about thirty percent of the radial height of the spoke.

9. The non-pneumatic tire and wheel assembly according to claim 6 wherein the axial width of the protruding member is from about twenty percent to about thirty percent of the radial height of the spoke.

10. The non-pneumatic tire and wheel assembly according to claim 6, wherein the tapered central section is a straight line taper.

11. The non-pneumatic tire and wheel assembly according to claim 6, wherein the radial height of the inner portion is from about forty percent to about sixty percent of the radial height of the spoke.

* * * * *